P. Murray,
Steam-Engine Valve-Gear.
Nº 31,474. Patented Feb. 19, 1861.

UNITED STATES PATENT OFFICE.

PETER MURRAY, OF DETROIT, MICHIGAN.

STEAM-ENGINE.

Specification of Letters Patent No. 31,474, dated February 19, 1861.

*To all whom it may concern:*

Be it known that I, PETER MURRAY, of Detroit, in the county of Wayne and State of Michigan, have invented a new and useful Improvement in Steam-Engines for the Use of Ordinary and Superheated Steam Combined; and I do hereby declare that the following is a full, clear, and exact description of the same, reference being had to the accompanying drawings, forming part of this specification, in which—

Figure 1:
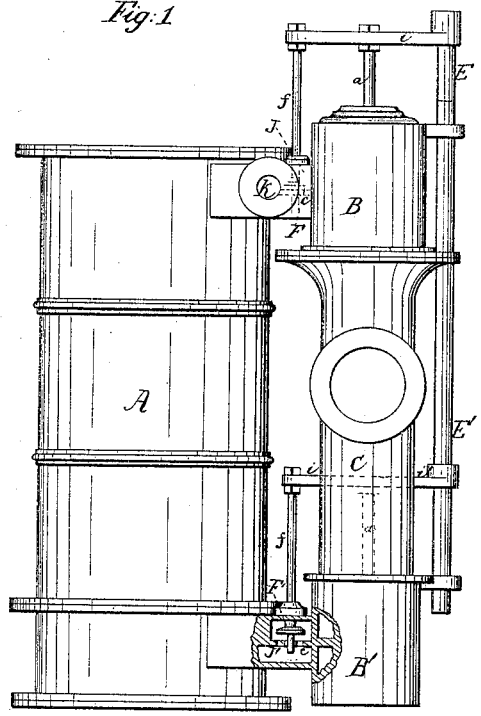
Figure 2:
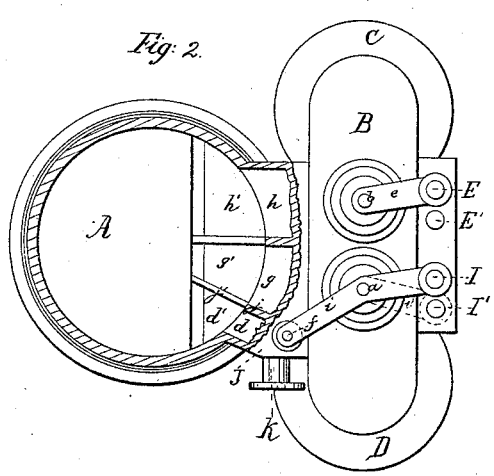

Figure 1 is a side view of the cylinder valve chest, and side pipes of an upright engine with my improvement representing the lower valve chest partly broken away to expose the valve by which superheated steam is admitted at the lower end of the cylinder. Fig. 2 is a plan of the same, the cylinder being in section.

Similar letters of reference indicate corresponding parts in both figures.

My invention consists in constructing and furnishing the cylinder of the engine with a system of separate induction passages, ports, and valves by which the superheated and ordinary steam are admitted separately to the cylinder, to be mixed therein as required for use, instead of being mixed in the main steam pipe, whereby some important advantages are obtained as will be hereinafter explained.

To enable others skilled in the art to apply my invention to use I will proceed to describe its construction and operation.

A is the cylinder, B, B′ are the valve chests, and C, D, the pipes, all constructed as in the ordinary upright puppet valve steam engine.

I, I′ are the induction valve lifting-rods; and E, E′, the eduction valve lifting-rods; all arranged in the usual manner, and having the stems $a$, and $b$, of their respective valves which are contained in the chests B, B′, connected with them by arms $i$, $i'$, and $e$, $e'$, which are constructed and arranged in the usual manner; but the arms $i$, $i'$, of the induction valve rods I, I′, are made longer than usual for the attachment of the stems $f$, $f'$, of the superheated steam valves F, F′. The ordinary induction valves contained in the chests B, B′, only serve for the induction of ordinary steam to the cylinder, such induction being through the usual ports $g$, $g'$, (see Fig. 2), $g$, being the port at the upper, and $g'$, the port at the lower end of the cylinder.

$h$, $h'$ are the two eduction ports.

On the outer side of the upper induction port $g$, and between the upper main valve chest B, and the cylinder there is arranged a small valve chest J, containing the puppet-valve F, for admitting superheated steam to the upper end of the cylinder; and in a similar position with respect to the lower induction port $g'$, and main valve chest B′, there is a similar small valve chest J′ containing the puppet-valve F′, for admitting superheated steam to the lower end of the cylinder.

The chest J, has connected with it a pipe K, through which the superheated steam is supplied to it, and the chest J′, has connected with it a similar pipe; but this pipe is not shown, being removed in Fig. 1, to show the interior of the valve chest J, and being hidden in Fig. 2 by the upper pipe K. These two superheated steam pipes may be branches of a single pipe coming from the superheating apparatus. The steam-chest J′, is shown in section in Fig. 1, and J is just like J′. The superheated steam is conveyed into each of said chests by its respective pipe, above its valve seat $c$, and is admitted from below the valve seat by a port $d$, or $d'$, to the upper or lower end of the cylinder as its valve F, or F′, is raised by the arm $i$, or $i'$, of the rod I, or I′, along with the ordinary induction valve at the same end of the cylinder. The ports $d$, $d'$, are separated from the ordinary steam ports $g$, $g'$, all the way to the cylinder by partitions $j$, $j'$.

The superheated steam valves F, F′, being raised each in turn along with the ordinary induction valve at the corresponding end of the cylinder, it is obvious that simple and superheated steam are admitted simultaneously to each end of the cylinder in turn. It is also obvious that as the ports $g$, $g'$, are separated from those $d$, $d'$, all the way to the cylinder no admixture of the ordinary and superheated steam can take place till they arrive within the cylinder where they are to be used, and by arranging the valves F, F′, close to the cylinder the superheated steam is brought perfectly under control, and none of it wasted, as is the case when the admixture with ordinary steam is permitted to take place in the main steam pipe at a distance from the cylinder. A further advantage may be obtained by the employment of a separate valve gear to operate the superheated steam valves instead of operating them by the same valve gear as the ordinary steam valves, as in that case the superheated steam can be cut off at such point in the stroke of the piston, different from that at which the ordinary steam is cut off, as may be found, in practice, desirable.

I am aware that the application and use of superheated, and ordinary steam, mixed together, is broadly covered by the patent of Messrs. Wetherell, 1854, and this I do not claim; but

What I claim as my invention, and desire to secure by Letters Patent is:—

Constructing and furnishing the cylinder of the engine with a system of separate induction passages, ports and valves by which the superheated and ordinary steam are admitted separately to the cylinder, substantially as and for the purpose herein specified.

PETER MURRAY.

Witnesses:
S. McDONALD,
PETER M. McNOAH.